(12) United States Patent
Haywood et al.

(10) Patent No.: US 7,012,896 B1
(45) Date of Patent: Mar. 14, 2006

(54) DEDICATED BANDWIDTH DATA COMMUNICATION SWITCH BACKPLANE

(75) Inventors: Christopher Haywood, Thousand Oaks, CA (US); Geoffrey C. Stone, Malibu, CA (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/154,966

(22) Filed: Sep. 17, 1998

Related U.S. Application Data

(63) Continuation-in-part of application No. 09/063,493, filed on Apr. 20, 1998, now Pat. No. 6,314,106.

(51) Int. Cl.
*H04L 12/26* (2006.01)
*H04L 12/28* (2006.01)

(52) U.S. Cl. ............ 370/236; 370/417; 370/235; 370/419

(58) Field of Classification Search ........... 370/364, 370/360, 362, 462, 468, 400–401, 438, 411–419, 370/423, 224–236, 395
See application file for complete search history.

(56) References Cited

U.S. PATENT DOCUMENTS

| 4,866,702 A | * | 9/1989 | Shimizu et al. ............ 370/438 |
| 4,985,889 A | * | 1/1991 | Frankish et al. ............ 370/400 |
| 5,127,000 A | | 6/1992 | Henrion |
| 5,345,447 A | | 9/1994 | Noel |
| 5,422,880 A | * | 6/1995 | Heitkamp et al. .......... 370/400 |
| 5,499,239 A | * | 3/1996 | Munter ..................... 370/423 |
| 5,521,923 A | | 5/1996 | Willmann et al. |
| 5,568,476 A | | 10/1996 | Sherer et al. |
| 5,602,850 A | | 2/1997 | Wilkinson et al. |
| 5,682,383 A | * | 10/1997 | Dahod et al. ............... 420/463 |
| 5,729,546 A | * | 3/1998 | Gupta et al. ............. 370/395.6 |
| 5,910,954 A | * | 6/1999 | Bronstein et al. ............ 370/401 |
| 5,914,953 A | | 6/1999 | Krause et al. |
| 5,953,340 A | * | 9/1999 | Scott et al. ................. 370/465 |
| 6,023,471 A | * | 2/2000 | Haddock et al. ............ 370/462 |
| 6,026,075 A | | 2/2000 | Linville et al. |
| 6,084,856 A | | 7/2000 | Simmons et al. |
| 6,092,108 A | | 7/2000 | DiPlacido et al. |
| 6,115,387 A | | 9/2000 | Egbert et al. |
| 6,141,323 A | | 10/2000 | Rusu et al. |
| 6,185,222 B1 | * | 2/2001 | Hughes ..................... 370/414 |
| 6,442,170 B1 | * | 8/2002 | Perlman et al. ............. 370/400 |

FOREIGN PATENT DOCUMENTS

WO    WO 97/44938 A1    11/1997

OTHER PUBLICATIONS

"ExponeNT Switch Fabric Whitepaper," Berkeley Networks, Inc., pp. 1-5, May 1998.

* cited by examiner

*Primary Examiner*—Steven Nguyen

(57) ABSTRACT

A LAN switch has a backplane matrix in which each controller has a dedicated packet bus for propagating packet data. Each bus has a root interfacing with the transmitting (root) controller and a plurality of leaves interfacing with receiving (leaf) controllers. This configuration enables each controller to simultaneously transmit packet data on the root of a bus and receive packet data off a plurality of leaves of other buses without contention. An efficient filtering and stalling system employed at the receive side of the backplane prevents the highly parallel traffic from causing receive side congestion.

6 Claims, 8 Drawing Sheets

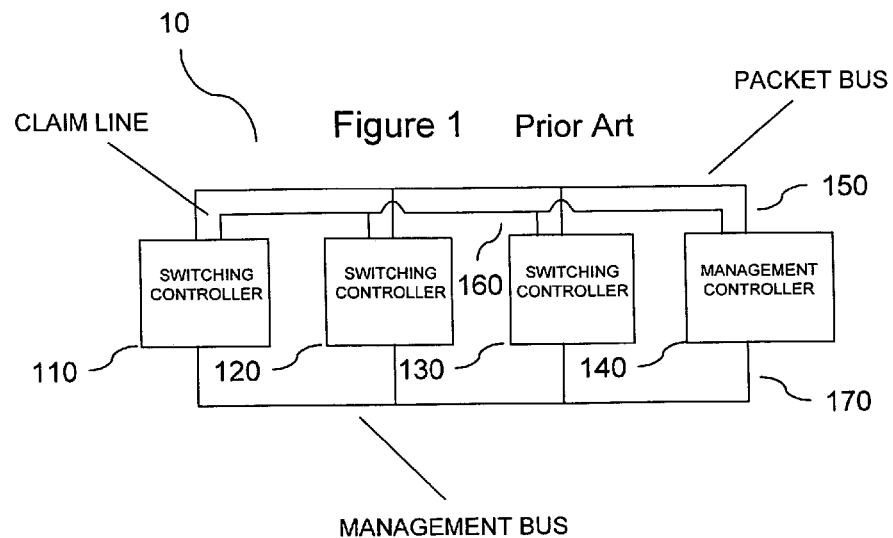
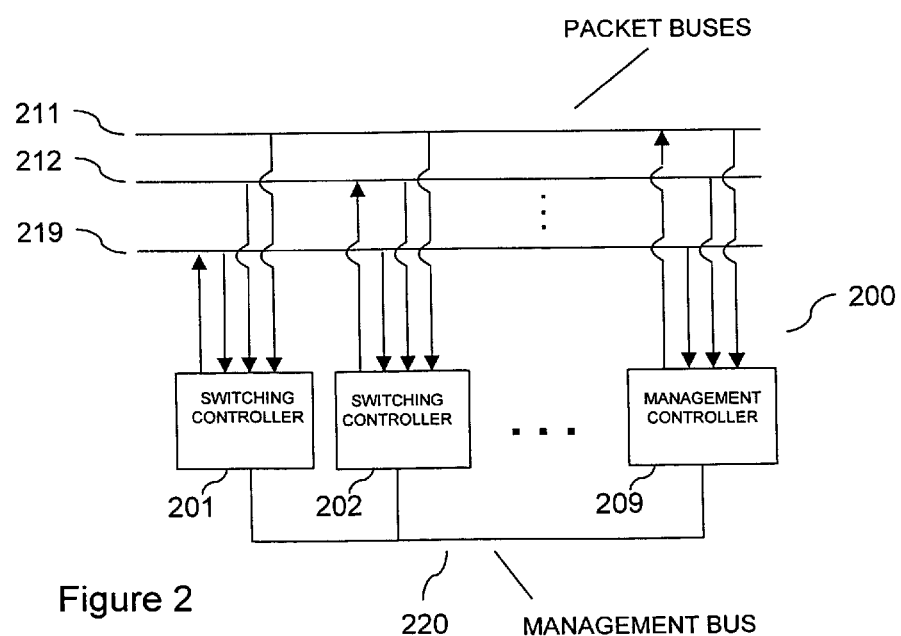

DEDICATED BANDWIDTH DATA COMMUNICATION SWITCH BACKPLANE

This is a continuation-in-part of application Ser. No. 09/063,493, filed Apr. 20, 1998, now U.S. Pat. No. 6,314, 106.

BACKGROUND OF THE INVENTION

The present invention relates to data communication switching, and more particularly to local area network (LAN) switching.

LAN switches interconnect network devices residing on different protocol domains. The switching functionality provided by LAN switches typically includes "local" switching between network devices on protocol domains interfacing with the same switching controller and "backplane" switching between network devices on protocol domains interfacing with different switching controllers. The backplanes used in LAN switch backplane switching have generally been configured as a packet bus shared by a plurality of controllers. A conventional LAN switch backplane is illustrated in FIG. 1. LAN switch backplane 10 includes switching controllers 110, 120, 130 and a management controller 140 taking turns transmitting packets over packet bus 150 and asserting a shared claim line 160 to notify other controllers when they have captured a packet off bus 150. Management controller 140 is the "nerve center" of the backplane which assists switching controllers 110, 120, 130 in learning information for use in determining whether packets are to be captured or filtered and communicates such information to switching controllers 110, 120, 130 on management bus 170. In such conventional backplanes, orderly transmission over the packet bus is known to have been accomplished in several ways. One way is assigning the controllers different time slots in a repetitive timing cycle and granting control of the packet bus to the controllers round-robin in accordance with their assigned time slots. Another way involves conducting a priority-based arbitration among the controllers having packets for transmission and granting control of the bus to the controller which wins the arbitration. Regardless of whether one of these or some other ordering scheme is implemented, reliance on a shared bandwidth backplane, and its inherent requirement of regulating access in order to guarantee contention-free transmission, has led to congestion at the transmit side of such backplanes and inefficient use of resources at the receive side of such backplanes. For example, packets transmitted across the packet bus often captured off the bus by only one switching controller and are filtered by others. However, due to its essential broadcast nature, all controllers must wait for the packet to clear the packet bus before the next packet can be transmitted. This delay results in clock cycles in which the receive resources of many controllers are idle, even while congestion may be developing at the transmit side. Thus, a more efficient LAN switch backplane is needed, particularly as network devices relying on such backplanes continue to migrate to ever-higher transmission rate protocols.

SUMMARY OF THE INVENTION

In its most basic feature, the present invention reduces transmit side congestion in a LAN switch backplane through the expedient of a backplane matrix in which each controller has a dedicated packet bus for propagating packet data. Each bus has a root interfacing with the transmitting (root) controller and a plurality of leaves interfacing with receiving (leaf) controllers. This configuration enables each controller to simultaneously transmit packet data on the root of a bus and receive packet data off a plurality of leaves of other buses without contention. An efficient filtering and stalling system employed at the receive side of the backplane prevents the highly parallel traffic from causing receive side congestion.

In the filtering system, each controller determines individually whether the destination address in a packet received on a packet bus corresponds to a forwarding address for the controller. If the destination address corresponds to a forwarding address for the controller, the controller captures the packet for forwarding and notifies other controllers of the capture on a claim line maintained between the controllers especially for the packet bus. Through the sharing of claim information on claim lines dedicated to particular packet buses, controllers which have not captured the packet are advised that the packet has a known destination addresses, such that the non-capturing controllers may filter the packet.

In the stalling system, leaf controllers notify the root controller if a forwarding queue for holding packets captured off a packet bus has insufficient room. To this end, a stall line is maintained between the leaf controllers and the root controller for each packet bus so it is known to which bus a stall signal relates. By sharing congestion information on stall lines dedicated to particular packet buses, notified root controllers learn that they are transmitting packet data at an excessive rate and delay further transmission of packet data until notified that the congestion condition has abated.

These and other aspects of the invention will be better understood by reference to the following detailed description, taken in conjunction with the accompanying drawings which are briefly described below. Of course, the actual scope of the invention is defined by the appended claims.

BRIEF DESCRIPTION OF THE DRAWINGS

FIG. 1 is a block diagram of a prior art LAN switching backplane;

FIG. 2 is a block diagram of a LAN switching backplane with dedicated packet buses operative in accordance with the present invention;

DETAILED DESCRIPTION OF THE PREFERRED EMBODIMENT

Figure 3:
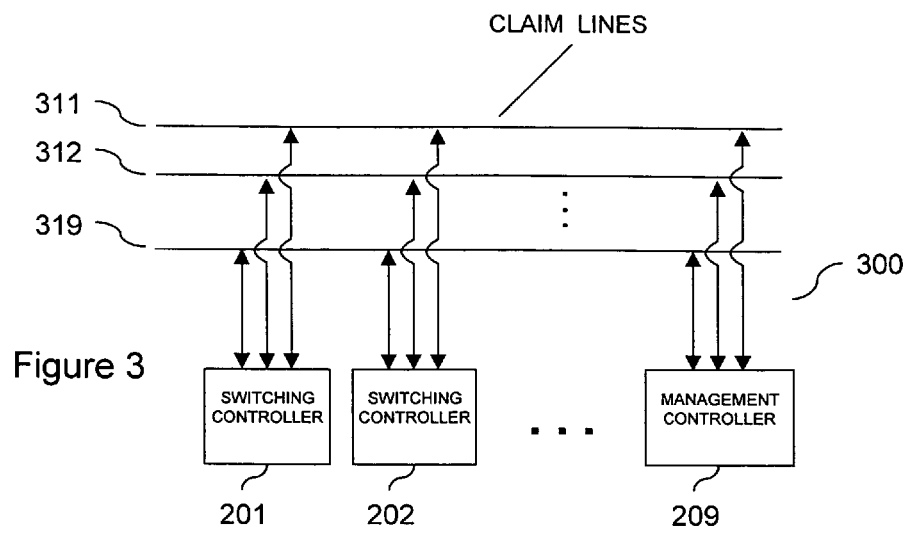
FIG. 3 is a block diagram illustrating the claim line architecture operative in conjunction with the LAN switching backplane of FIG. 2.

In FIG. 2, a LAN switching backplane 200 operative in accordance with the present invention is shown. Backplane 200 includes a matrix of packet buses 211–219 driven by controllers 201–209, respectively. Each bus has a root interfacing with the controller having the exclusive right to transmit packet data on the bus (i.e., the root controller) and leaves interfacing with the controllers receiving packet data off the bus (i.e., the leaf controllers). Preferably, each controller is the root controller on one of buses 211–219 and is a leaf controller on all buses 211–219, including the bus for which it is the root controller. Packets are preferably transmitted on buses 211–219 in a series of constant-bit data bursts at a rate of one burst per clock cycle. Buses 211–219 are broadcast-oriented such that all data bursts propagated on a bus reach all controllers 201–209. Thus, on any particular clock cycle, all controllers 201–209 may transmit a single data burst and may receive a plurality of data bursts. It will be appreciated that by dedicating a packet bus to each one of controllers 201–209, there is no need to police transmission across backplane 200 under normal operating conditions. Of course, the number of root controller/packet bus pairs will vary depending on network requirements. In addition to transmitting and receiving packet data, management controller 209 serves as the "nerve center" of backplane 200 which assists switching controllers 201–208 in learning their respective forwarding addresses by transmitting such addresses on management bus 220.

In the most basic backplane switching operation, controllers 201–209 individually conduct filtering checks on each packet received off buses 211–219. In filtering checks, packet destination addresses are compared with the controller's forwarding addresses. Filtering checks result in each controller making a decision as to whether to capture for forwarding or filter each packet. The decision is generally made based on a determination of whether the packet contains a destination address recognized by the controller as a forwarding address. However, controllers 201–209 share the results of such determinations to avoid filtering packets whose destination address is not recognized by any controller as a forwarding address. Such "unknown destination" packets are captured by all controllers. More particularly, in an exemplary filtering check, a controller applies the following filtering rules:

1. If the packet has a destination address recognized as a forwarding address for the controller, the filtering check is passed. The packet is captured.
2. If the packet has a destination address not recognized as a forwarding address for the controller, and the controller learns that the destination address is a forwarding address for another controller, the filtering check is failed. The packet is filtered.
3. If the packet has a destination address not recognized as a forwarding address for the controller, and the controller learns that the destination address is a not forwarding address for another controller, the filtering check is passed. The packet is captured.

The possibility of packets having a destination address not recognized as a forwarding address for any controller exists because unicast (i.e., single destination) forwarding address are learned dynamically through a source learning process. The source learning process is assisted by management controller 209 and operates generally as follows. A packet originates on a network device residing on a protocol domain associated with one of controllers 201–209. The packet includes a source address of the originating network device and, if the packet is a unicast packet, a destination address of the network device for which the communication is intended. Layer 2 (data link) addresses are contemplated. The packet arrives at a LAN port controller on the associated one of controllers 201–209, which provides an interface to the protocol domain on which the packet originated. If the packet's source address is not recognized as a forwarding address for the controller, the packet is submitted to management controller 209 for a source learning operation which results in the address being "learned", i.e., added to the controller's list of forwarding addresses. Thereafter, when conducting filtering checks on packets received off packet buses 201–209 which have the learned address as a destination address, the controller will recognize such packets as being destined for a network device on one of the controller's associated protocol domains and will capture such packets for forwarding. However, when conducting filtering checks on such packets before the address is learned, the controller will not recognize such packets as being destined for a network device on one of the controller's associated protocol domains. To avoid the undesirable result of having such packets filtered unwittingly by the controller, a claiming system is implemented in which controllers 201–209 "wait and see" whether each packet has been captured by one of controllers 201–209 before filtering it. If no controller provides notice through the claiming system that it has captured the packet, all controllers will know that the packet is an "unknown destination" packet and will capture it for forwarding. To this end, the claiming system is implemented using a claiming architecture through which controllers 201–209 notify one another of the claimed status of packets. Turning to FIG. 3, a preferred claiming architecture 300 for use in conjunction with backplane 200 is shown. Architecture 300 includes claim lines 311–319 for conveying claim signals. Claim lines 311–319 are shared by controllers 201–209 such that each controller is able to transmit and receive claim signals on each one of claim lines 311–319. Each one of claim lines 311–319 relates claim signals for a particular one of packet buses 201–209, such that controllers 201–209 will know to which packet a claim signal relates.

Figure 4:
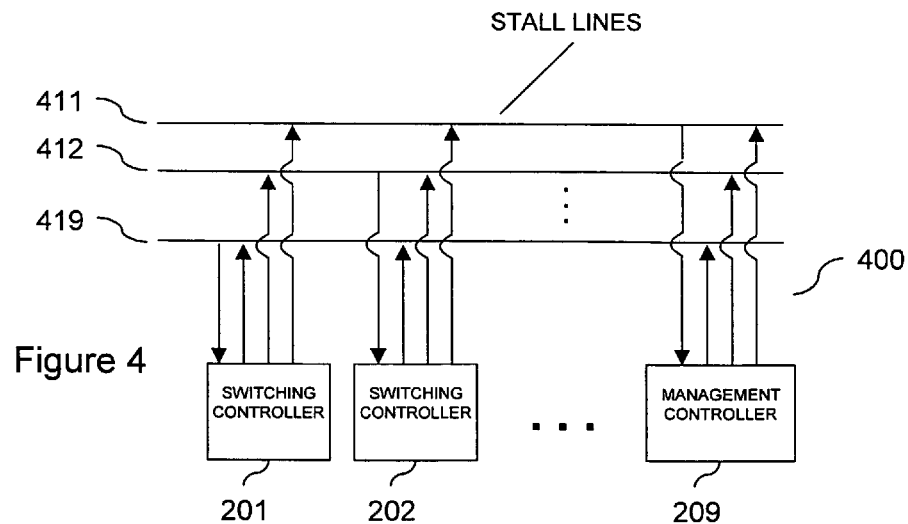
FIG. 4 is a block diagram illustrating the stall line architecture operative in conjunction with the LAN switching backplane of FIG. 2.

Even though controllers 201–209 judiciously filter packets in accordance with the filtering rules described above, the traffic received by a controller off a bus may sometimes exceed a controller's queuing capacity. A stalling system is implemented to prevent receive side congestion during such high traffic periods. Referring to FIG. 4, a preferred stall line architecture 400 implemented in conjunction with backplane 200 is shown. Architecture 400 has stall lines 411–419 for conveying stall signals. Each one of stall lines 411–419 relates congestion information for a different one of packet buses 201–209. Stall lines 411–419 are shared by leaf controllers for transmitting congestion information to the root controller for the packet bus. Note that because stall lines 411–419 relate to particular packet buses, the assertion of one of stall lines 411–419 will only suspend the flow of additional packet data from the root controller whose excessive rate transmission is causing the congestion condition. Transmission from other (unstalled) root controllers on their respective ones of packet buses 211–219 is advantageously allowed to continue.

In addition to helping individual controllers learn their forwarding addresses, management controller 209 advises all controllers of virtual local area networks (VLANs) assigned to forwarding addresses active on any controller in backplane 200. VLAN lists advantageously allow controllers 201–209 to perform a VLAN check to determine if a captured packet's source and destination addresses are authorized to communicate, as indicated by their membership in a shared VLAN, before forwarding the packet on their associated protocol domains. To the extent the VLAN membership for a packet's source and destination addresses has not been learned, controllers 201–209 perform VLAN checks using the VLAN membership for the source port, i.e., the port on which the packet arrived at the root controller, and the destination port, i.e., the port on which the packet would be allowed to leave leaf controller if the check were successful. In this regard, port VLAN membership is defined such that source and destination ports are deemed members of all VLANs of which any network device known to reside on the protocol domain associated with the port is a member.

Figure 5:
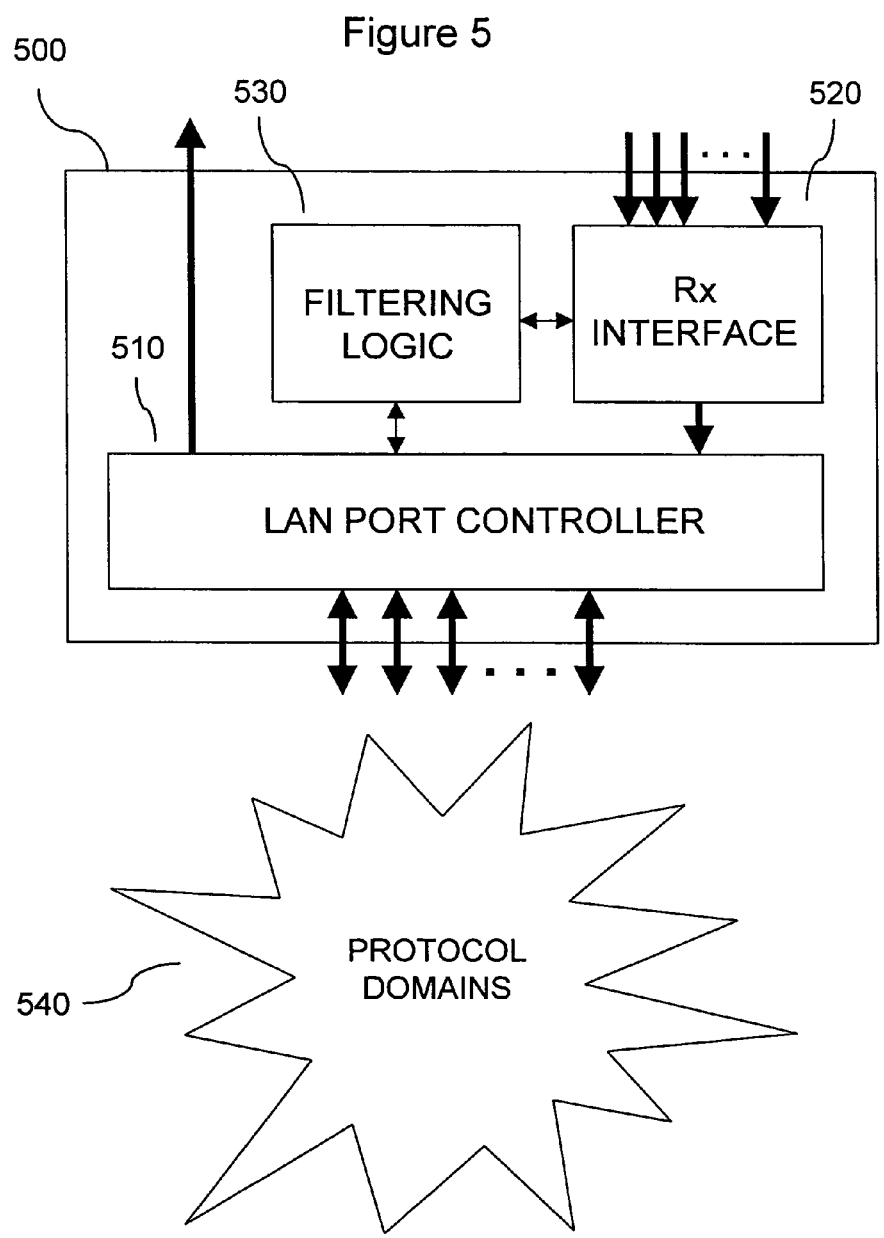
FIG. 5 is a block diagram of a switching controller operative in the LAN switching backplane of FIG. 2.

Turning now to FIG. 5, switching controller 500 operative on LAN switch backplane 200 is shown. Switching controller 500 is representative of switching controllers 201–208 and is also representative of the switching elements of management controller 209. However, management controller 209 has other elements for assisting source learning. Accordingly, management controller 209 may be regarded as an enhanced switching controller. Controller 500 includes LAN port controller 510 and receive interface 520 sharing filtering logic 530. LAN port controller 510 captures packets off protocol domains 540, formats them and propagates them on dedicated packet bus 211 as the root controller for that bus. Subject to filtering rules, receive interface 520 captures packets off packet buses 211–219 as one of the leaf controllers for that bus, formats them and forwards them to LAN port controller 510. Subject to VLAN rules, LAN port controller 510 receives packets from receive interface 520, formats them and propagates them on protocol domains 540. Although a plurality of protocol domains are illustrated, controller 500 may be associated with one or more protocol domains, as network requirements demand. Transmit and receive processing are preferably performed on controller 500 using direct memory access (DMA) techniques implemented in integrated circuitry, although processor intervention is judiciously employed for configuration and relatively high-level tasks. Protocol domains 540 preferably each include one or more network devices operating in a particular communication protocol, such as Ethernet (operating at 10 Mbps, 10/100 Mbps, 100 Mbps or 1000 Mbps), Token Ring FDDI or ATM. Naturally, if the operative protocol is ATM, controller 500, in addition to the functionality described herein, has segmentation and reassembly (SAR) logic to accomplish packet-to-cell and cell-to-packet conversions. It bears noting that the plurality of controllers 201–209 sharing backplane 200 at the same time may support protocol domains operative in disparate communication protocols. Thus, for example, one of controllers 201–209 may support Fast Ethernet protocol domains, while a second may support Token Ring protocol domains, and a third may support an ATM protocol domain.

Figure 6:
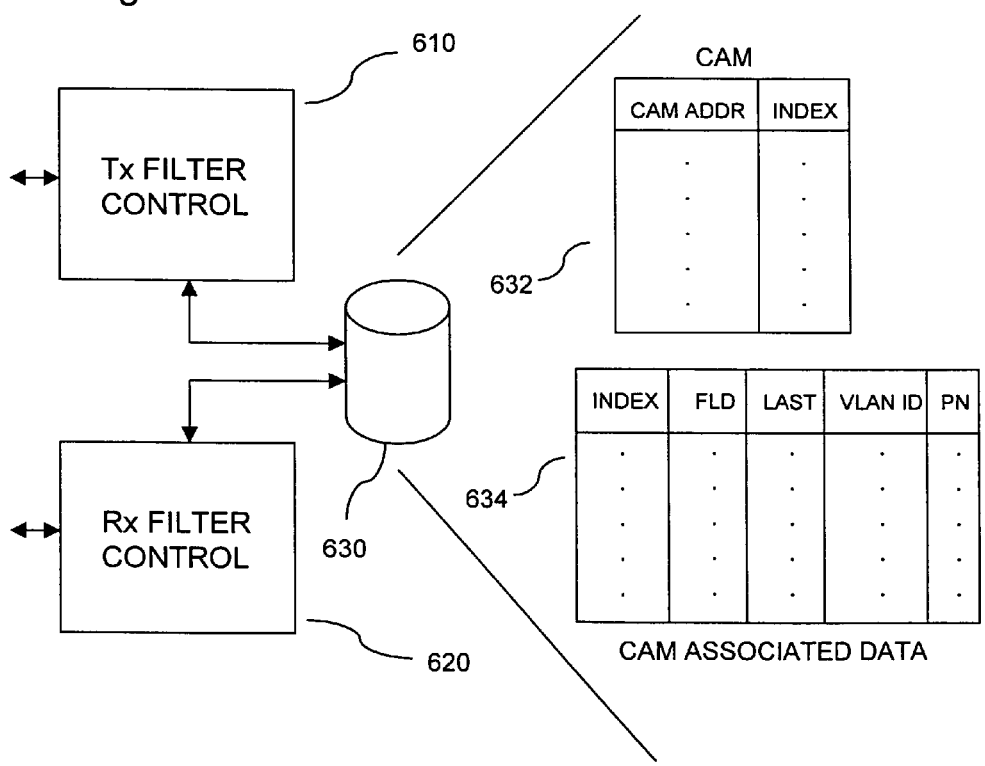
FIG. 6 is a block diagram of filtering logic operative in the switching controller of FIG. 5.

Turning now to FIG. 6, filtering logic 530 operative on representative switching controller 500 will be described in greater detail. Logic 530 is dual-ported for shared access by LAN port controller 510 and receive interface 520. Memory 630 may be accessed via transmit filter control 610 and receive filter control 620, associated with LAN port controller 510 and receive interfaces 520, respectively. Memory 630 includes a CAM 632 having entries holding, at different CAM indices, learned forwarding addresses of network devices residing on the controller's protocol domains. Forwarding addresses also may include configured flood addresses for forwarding broadcast packets. Memory 630 also includes CAM associated data 634 having entries linked to entries in CAM 632 or in the CAM on another one of controllers 202–209 by a common CAM index. CAM associated data entries include a flood field, a "last seen" field, a VLAN field and a port field. The flood field holds a flag indicating whether the entry is associated with a flood address. The "last seen" field holds a time stamp indicating the last time the entry was accessed. The VLAN field identifies the VLAN membership of the network device, if any, to which the entry relates. The VLAN field may include multi-bit numerical representations for each identified VLAN or may be in the form of a VLAN mask in which a VLAN is identified by the bit value retained at a position in the entry reserved for the VLAN. The port field identifies the number of the LAN port through which the network device to which the entry relates, if any, accesses controller 500. As is well known, addresses submitted to CAM 632 return, in a single "look-up" operation, all indices at which a matching address resides. The returned indices may be advantageously used to consult the corresponding entry in CAM associated data 634 and retrieve information associated with the matching address. Of course, other types of memory elements and logic may be implemented in lieu of CAM 632, such as a "pseudo CAM" which resolves the most distinctive bits in addresses using a data hashing algorithm and conducts associative comparisons in a random access memory (RAM) using the most distinctive bits. CAM associated data 634 may be implemented in RAM.

Figure 7:
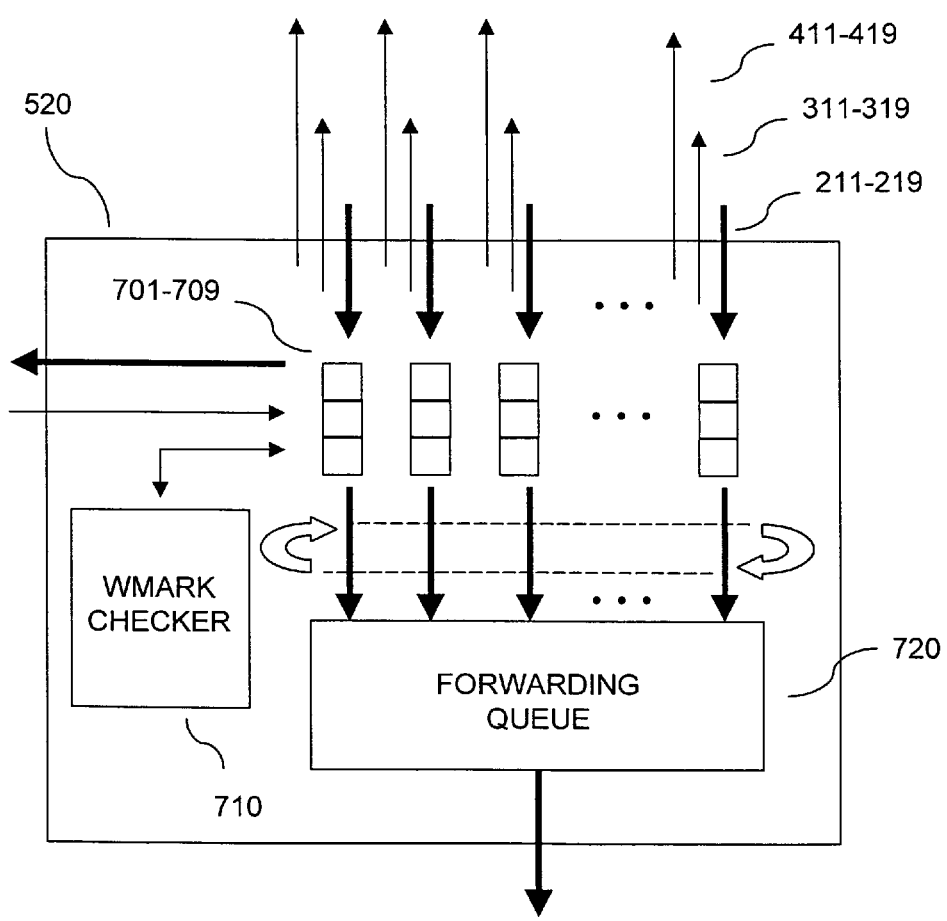
FIG. 7 is a block diagram of a receive interface operative in the switching controller of FIG. 5.

Referring now to FIG. 7, receive interface 520 operative on representative controller 500 is shown in greater detail. Receive interface 520 implements preferred filtering and stalling systems with the expedients of receive ports 701–709, receive filter control 620, watermark checker 710 and forwarding queue 720. Each receive port has a receive buffer fed with data bursts arriving off a different one of packet buses 211–219. In this regard, returning momentarily to FIG. 2, it will be recalled that each controller has a dedicated packet bus for transmitting data bursts to all controllers simultaneously. Receive ports 701–709 perform filtering checks and, where indicated, stalling checks on received packets and are assigned distinct "start release" clock cycles within a repetitive timing cycle such that, if both the filtering and stalling checks are passed, receive ports 701–709 may initiate the release of packets to forwarding queue 720 on their assigned "start release" clock cycles. Packets in forwarding queue 720 are eventually forwarded to LAN port controller 510 for a VLAN check and, where indicated, transmission on protocol domains 540. Receive ports 701–709, of course, have associated claim lines 311–319 and stall lines 411–419 for employing, where indicated, in the preferred filtering and stalling systems.

Figure 8:
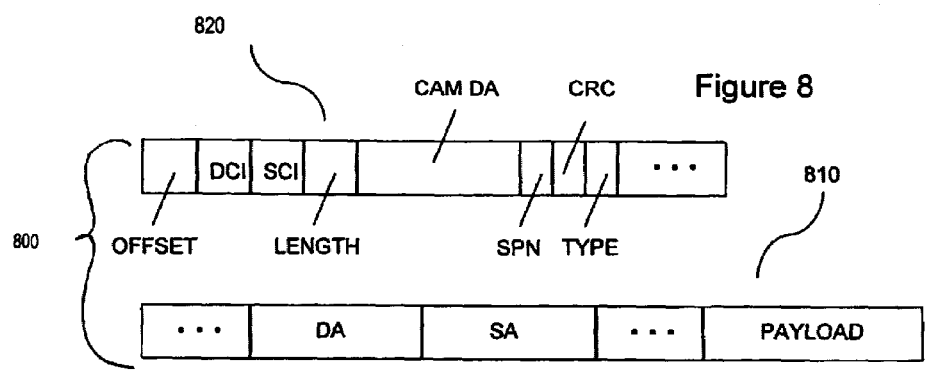
FIG. 8 is a packet formatted for transmission across the switching backplane according to FIG. 2.

Turning now to FIG. 8, an exemplary packet in a format suitable for transmission on packet buses 211–219 is shown. Packet 800 includes a base packet 810 and a packet bus header 820. Controllers 201–209 prepend packet bus headers to base packets before propagating them on buses 211–219 and strip packet bus headers off base packets before propagating them on protocol domains. Packet bus header 820 includes an offset, a CAM destination address field, a source port number field, a cyclic redundancy check field and a LAN protocol type field. Base packet 810 includes a Layer 2 destination address, a Layer 2 source address and a payload.

Figure 9:
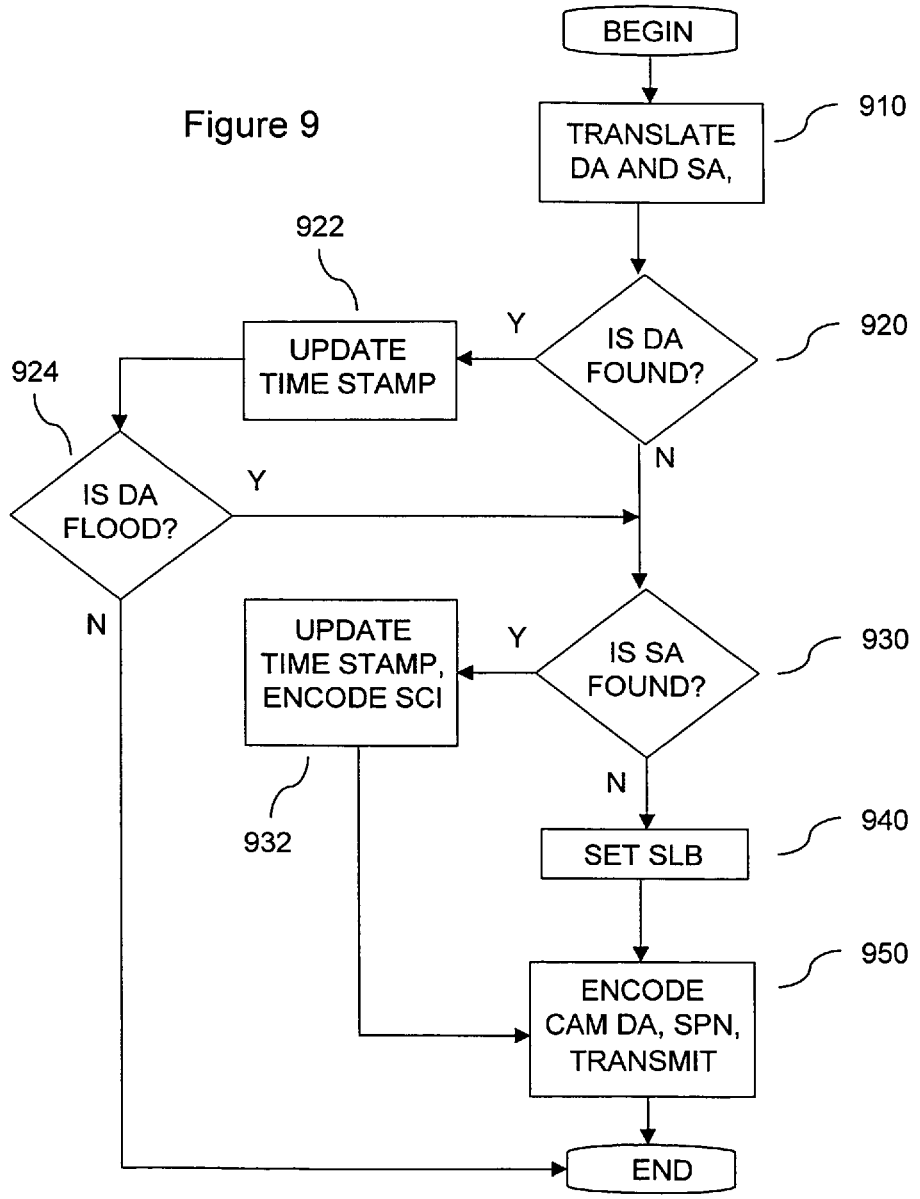
FIG. 9 is a flow diagram of transmit processing on an exemplary packet in the LAN switching backplane of FIG. 2.
Figure 10:
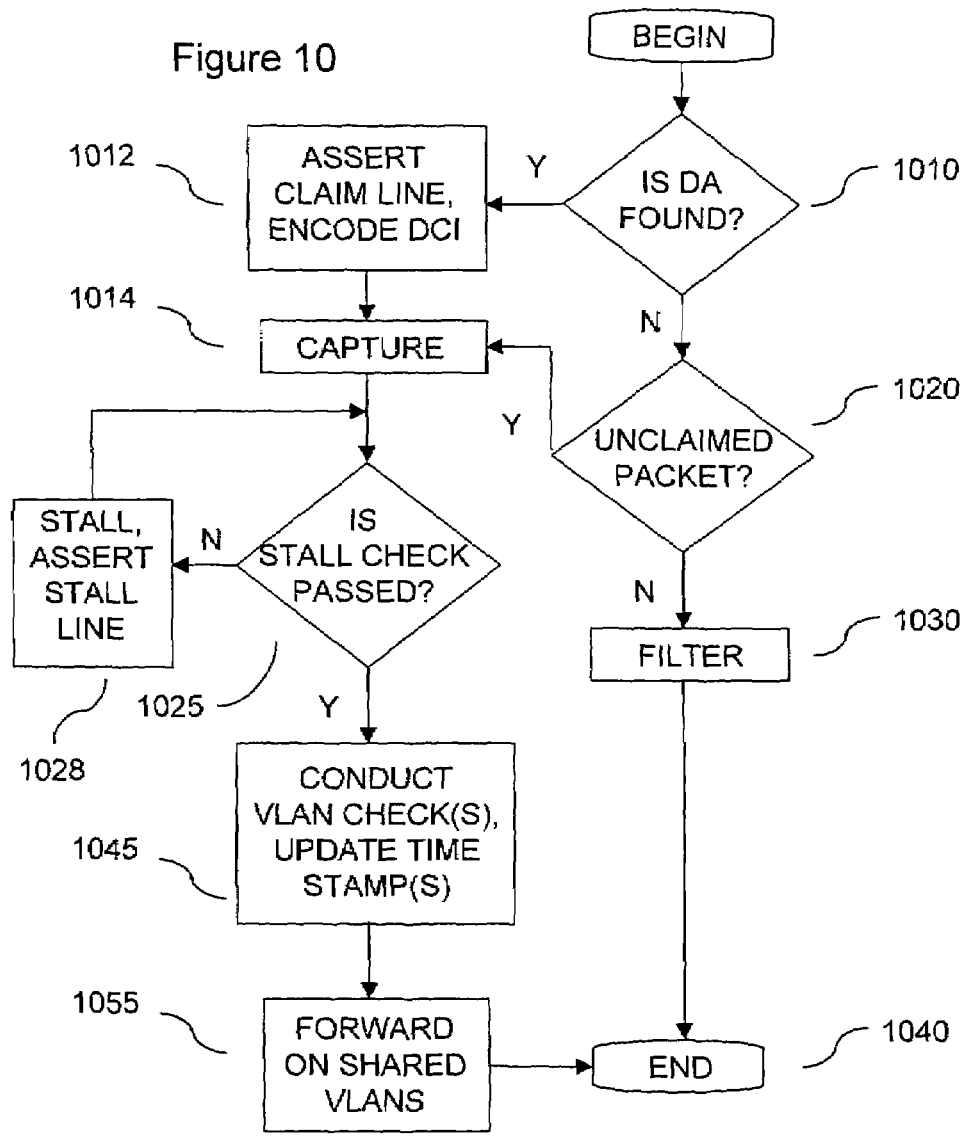
FIG. 10 is a flow diagram of receive processing on an exemplary packet in the LAN switching backplane of FIG. 2.

The basic switching operation conducted in backplane 200 will now be described in greater detail with reference to the flow diagrams of FIGS. 9 and 10. The transmit processing flow begins when a packet propagated on a protocol domain arrives at the LAN port controller on one of controllers 201–209. At the LAN port controller, the bit ordering of the packet's Layer 2 source and destination address is modified, if necessary, to comply with the bit ordering convention used in backplane 200 (910). As is well known, different LAN protocols use different bit ordering conventions for Layer 2 addressing, e.g., most significant bit first (MSB) for Ethernet vs. least significant bit first (LSB) for Token Ring. Therefore, to avoid processing errors, the CAMs in all controllers sharing backplane 200 use a common bit ordering convention and Layer 2 addresses are modified, where necessary, to conform to the convention before CAM "look-ups" are performed on the addresses. The (convention-conforming) Layer 2 destination address is transferred to the controller's filtering logic for CAM "look-up" (920). If the destination address is found in the CAM, an index is returned, indicating that the destination address matches a forwarding address for the controller. In that event, the returned CAM index is used to access the corresponding entry in the controller's CAM associated data. The time stamp in the "last seen" field of the entry is updated to indicate that the entry has been accessed (922). In this regard, addresses in CAM whose corresponding entries in CAM associated data have a "last seen" field whose time stamp has become sufficiently remote in time are deleted from the CAM. By updating the "last seen" field, recently seen addresses are preserved while addresses not seen recently are allowed to be aged-out. The flood field in the accessed entry is reviewed to determine if the flood flag is set (924). In this regard, it bears noting that the controller's recognition of a packet's destination address as a forwarding address presents two possibilities: Either the packet's destination address is that assigned to a network device on one of the controller's associated protocol domains or is a flood address. If the flood flag is not set, it is known that the packet's destination address is that of a network device on one of the controller's associated protocol domains. In that event, the packet will be switched locally, i.e. will not be transmitted on the packet bus, and no additional preparation of the packet for transmission on the packet bus is required. If, however, the flood flag is set, or if the destination address was not found in the CAM in the first place, transmission on the packet bus is indicated. In that event, the (convention-conforming) source address is transferred to the controller's filtering logic for a CAM "look-up" (930). If the source address is found in the CAM, an index is returned, indicating that the address matches a forwarding address for the controller. The returned CAM index is used to access the corresponding entry in the controller's CAM associated data and is encoded in the packet's source CAM index field and the time stamp in the accessed entry is updated (932). If, however, the source address is not found in the CAM, the address must be source-learned and bit reserved to indicate the need for source learning is set in the packet's source CAM index field (940). By setting the source learning bit, management controller 209 will know to capture the packet off the packet bus and subject the packet to the dynamic source learning process. Whether or not the source address was found in the CAM, the convention-conforming destination address is encoded in the packet's CAM destination address field, the number assigned to the port on which the packet arrived at the controller is encoded in the packet's source port number field and the packet is propagated on the controller's dedicated packet bus (950) to complete transmit processing.

The receive processing flow begins when a sufficient number of data bursts for a packet arrive off a packet bus in a receive port on a leaf controller's receive interface. Receive processing will be described for a representative leaf controller, but is performed simultaneously on all leaf controllers. Turning to FIG. 10, when a sufficient number of data bursts for a packet have been received on a receive port, the receive port sends to the controller's receive filter control a request for initiating a filtering check in the controller's CAM. If the receive filter control has only one request pending on a particular clock cycle, the request is automatically granted. If the receive filter control has multiple pending requests on a particular clock cycle, however, selection among the competing requests is resolved through arbitration. One arbitration scheme which may be advantageously implemented is described in application Ser. No. 09/063,493 entitled "RECEIVE PROCESSING FOR DEDICATED BANDWIDTH DATA COMMUNICATION SWITCH BACKPLANE", which is owned by the assignee hereof. Once an arbitration has been completed in which the request is selected, a filtering check is initiated in the controller's CAM. The (convention-conforming) destination addresses from the packet's CAM destination address field is transmitted to the CAM for a "look-up" (1010). If the destination address is found in the CAM, an index is returned, indicating that the destination address matches a forwarding address for the controller. In that event, the filtering check has been passed. A claim signal is transmitted on the claim line associated with the receive port on which the packet is pending to indicate that the packet will be captured by the controller for forwarding, the returned CAM index is encoded in the packet's destination CAM index field (1012) and the packet is captured for forwarding (1022). If the destination address is not found in the CAM, however, the destination address is not recognized as a forwarding address for the controller. In that event, the controller listens on the claim line to whether another controller has claimed the packet (1020). If another controller has claimed the packet, the packet is known to be destined for a network device residing off another controller and the packet is dropped by the (non-claiming) controller (1030). If, however, no other controller has claimed the packet, the destination of the packet is unknown and the packet is captured for forwarding by the controller (1022). If the packet is captured, a stall check is performed. (1025). For this purpose, receive ports are assigned distinct "start check" clock cycles within a repetitive timing cycle for initiating stall checks in watermark checker. Stall checks are conducted ensure that the hold queue has ample room to queue the captured packet. The outcome of stall check is based on consideration of the fullness of the forwarding queue, a maximum acceptable fullness level established for the forwarding queue (i.e., the watermark), and the size of the packet for queuing. One stall check algorithm which may be advantageously implemented is described in application Ser. No. 09/063,493 entitled "RECEIVE PROCESSING FOR DEDICATED BANDWIDTH DATA COMMUNICATION SWITCH BACKPLANE", which is owned by the assignee hereof. If the stall check is failed, i.e., the forwarding queue is too full at present to receive the captured packet, the receive port is not allowed to release the captured packet to the queue. To avoid having the captured packet overwritten by a subsequent packet transmitted to the receive port over backplane 200, a stall signal is transmitted on a stall line to notify the root controller to suspend transmission of additional packets until release of the captured packet to the forwarding queue has been secured (1028). While in the stall mode, the receive port holding the captured packet continues to initiate stall checks on its assigned "start check" clock cycle until the stall check is passed, at which time the stall condition is lifted by deactivating the stall line. Of course, each receive port has a dedicated stall line and stall conditions are imposed on a "per port" basis to avoid unnecessary disruption of the flow of packets across backplane 200. Once the stall check has been passed, the packet is released to the hold queue on the receive port's assigned "start release" clock cycle. The "start check" clock cycles assigned to a receive port for initiating stall checks may differ from its assigned "start release" clock cycle for commencing the release of a packet to the forwarding queue. Packets in the forwarding queue are eventually released to the controller's LAN port controller in a predetermined order. Once on the LAN port controller, one or more VLAN checks are conducted to determine if the packet's source is authorized to communicate with the destination, as indicated by membership in a common VLAN (1045). In the VLAN checks, the source CAM index and the destination CAM index from the packet, to the extent known, are used to access the corresponding entries in leaf controller's CAM associated data and retrieve the VLAN membership for the comparison. Naturally, the source CAM index will not be found if the packet's source address was not recognized in "look-up" conducted at the root controller. Similarly, the destination CAM index will not be found if the packet's destination address was not recognized in the "look-up" conducted at the leaf controller. To the extent the source and destination CAM indices are not found, entries corresponding to the packet's source and destination ports are accessed to make the VLAN comparison. The destination port's VLAN membership is also used where the packet's destination address is a flood address. More particularly, VLAN checks are performed in the LAN port controller, and the packet is selectively forwarded on shared VLANs (1055), in accordance with the following VLAN rules:

1. If both CAM indices are known, and the flood flag is not set in the DCI entry, the VLAN identifiers in the SCI and DCI entries are compared to determine if the packet's source and destination network devices share at least one VLAN. If a VLAN is shared, the packet is forwarded on the LAN port corresponding to the port number identified in the DCI entry. If no VLAN is shared, the packet is filtered.
2. If both CAM indices are known and the flood flag is set in the DCI entry, or if the source CAM index is known but the destination CAM index is unknown, the VLAN identifiers in the SCI entry are compared with the VLAN identifiers in each entry in the CAM associated data having a port number corresponding to one of the port controller's associated LAN ports to determine which ports, if any, share a VLAN with the packet's source network device. The packet is forwarded on all LAN ports found to share a VLAN with the packet's source network device. If no VLAN is shared, the packet is filtered.
3. If the source CAM index is unknown but the destination CAM index is known, the VLAN identifiers in the DCI entry are compared with the VLAN identifiers in each entry in the CAM associated data having a port number corresponding to the packet's source port number to determine whether the source port shares a VLAN with the packet's destination network device. If a VLAN is shared, the packet is forwarded on the LAN port corresponding to the port number identified in the DCI entry. If no VLAN is shared, the packet is filtered.
4. If both the source and destination CAM indices are unknown, or the source CAM index is unknown and the flood flag is set in the entry corresponding to the destination CAM index, the VLAN identifiers in each entry in the CAM associated data having a port number corresponding to the packet's source port number are compared with the VLAN identifiers in each entry in the CAM associated data having a port number corresponding to one of the port controller's associated LAN ports to determine which LAN ports, if any, share a VLAN with the packet's source port. The packet is forwarded on all LAN ports found to share a VLAN with the packet's source port. If no VLAN is shared, the packet is filtered.

Of course, the time stamp in the "last seen" fields of all accessed entries in CAM associated data are updated (1045).

It will be appreciated by those of ordinary skill in the art that the invention can be embodied in other specific forms without departing from the spirit or essential character hereof. The present invention is therefore considered in all respects illustrative and not restrictive. The scope of the invention is indicated by the appended claims, and all changes that come within the meaning and range of equivalents thereof are intended to be embraced therein.

We claim:

1. A dedicated bandwidth data communication switch backplane, comprising:
   a plurality of switching controllers;
   a plurality of packet buses, each of the packet buses comprising:
      a root, coupled to one of the plurality of switching controllers, for receiving packet data from the associated switching controller; and
      a plurality of leaves for transmitting packet data received from the root, wherein of the plurality of leaves are coupled to two or more of the plurality of switching controllers;
   each of the plurality of switching controllers is adapted to concurrently transmit packet data to every other switching controller, and each of the plurality of switching controllers is adapted to concurrently receive packet data from two or more of the plurality of switching controllers; and,
   a plurality of claim lines, each claim line interfacing with one or more of the plurality of the switching controllers and having an associaition with a different one of the plurality of packet busses, wherein a switching controller transmits a claim signal on a packet bus's associated claim line upon identifying a packet propagated on the packet bus for capturing.

2. The backplane according to claim 1, further comprising:
   a plurality of stall lines, each stall line having:
      a stall line root interfacing with a different one of the plurality of switching controllers, and
      a plurality of stall line leaves interfacing with two or more of the plurality of the switching controllers,
      wherein each stall line is associated with a different one of the packet buses;
   wherein a switching controller transmits a stall signal from a stall line leaf to the stall line root on a packet bus's associated stall line upon identifying a congestion condition for the packet bus.

3. The backplane according to claim 1, wherein at least one of the switching controllers comprises:
   a protocol domain interface adapted to receive packet data from a protocol domain;
   a transmit interface, coupled to a first packet bus of the plurality of packet buses, adapted to transmit packet data received from the protocol domain to one or more of the plurality of switching controllers; and
   a receive interface adapted to receive packet data transmitted from two or more of the plurality of switching controllers in parallel via two or more of the plurality of packet buses.

4. The backplane according to claim 3, wherein said at least one of the switching controllers further comprises:
   a plurality of claim line interfaces adapted to exchange claiming information for the received packet data with one or more of the plurality of switching controllers.

5. The backplane according to claim 3, wherein said at least one of the switching controllers further comprises:
   a plurality of stall line interfaces adapted to trait congestion information for the plurality of packet buses to one or more of the plurality of switching controllers.

6. A method for selectively filtering packets in a data communication switch backplane comprising a plurality of switching controllers and a plurality of packet buses, each packet bus having a root interfacing with a different one of the switching controllers and a plurality of leaves interfacing with two or more of the plurality of switching controllers, wherein two or more of the plurality of the switching controllers are adapted to transmit packet data in parallel from the plurality of roots, the method comprising:
   for each packet, on each receive interface, determining if the packet's destination address is a recognized forwarding address;
   for each packet, on each receive interface on which the packet's destination address is recognized, transmitting a claim signal to other receive interfaces on one of a plurality of claim lines reserved for the packet bus on which the packet was received;
   for each packet, on each receive interface on which the packet's destination address is not recognized, determining whether a claim signal has been received from another receive interface;
   on each receive interface, capturing the packet for which a destination address is recognized on the receive interface or for which a claim signal has not been received from another receive interface; and
   on each receive interface, filtering the packets for which a destination address is not recognized on the receive interface and for which a claim signal has been received from another receive interface.

* * * * *